US012662193B2

(12) United States Patent
Kim

(10) Patent No.: US 12,662,193 B2
(45) Date of Patent: Jun. 23, 2026

(54) STIFFNESS REINFORCEMENT STRUCTURE FOR VEHICLE

(71) Applicants: Hyundai Motor Company, Seoul (KR); Kia Corporation, Seoul (KR)

(72) Inventor: Jong-Min Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 317 days.

(21) Appl. No.: 18/356,527

(22) Filed: Jul. 21, 2023

(65) Prior Publication Data

US 2024/0190508 A1     Jun. 13, 2024

(30) Foreign Application Priority Data

Dec. 9, 2022     (KR) ........................ 10-2022-0171621

(51) Int. Cl.
*B62D 25/04*          (2006.01)
*B60K 1/04*           (2019.01)
*B62D 25/06*          (2006.01)

(52) U.S. Cl.
CPC ................ *B62D 25/04* (2013.01); *B60K 1/04* (2013.01); *B62D 25/06* (2013.01); *B60Y 2200/143* (2013.01)

(58) Field of Classification Search
CPC ........ B62D 25/00; B62D 25/04; B62D 25/05; B62D 27/023; B62D 27/02; B60K 1/04; B60K 2001/0405; B60Y 2200/91; B60Y 2200/143

USPC ....... 296/178, 23.01, 3, 193.05, 6, 210, 204, 296/29, 30
See application file for complete search history.

(56) References Cited

U.S. PATENT DOCUMENTS

| | | | | |
|---|---|---|---|---|
| 3,195,944 A | * | 7/1965 | Simmons | ........... B62D 33/0222 |
| | | | | 296/183.1 |
| 3,881,765 A | * | 5/1975 | Cerra | ..................... B62D 31/02 |
| | | | | 52/48 |
| 4,993,329 A | * | 2/1991 | Takeich | ............... B61D 17/041 |
| | | | | 105/396 |

FOREIGN PATENT DOCUMENTS

KR          20120060073 A      6/2012

* cited by examiner

*Primary Examiner* — Jacob S. Scott
(74) *Attorney, Agent, or Firm* — Slater Matsil, LLP

(57) ABSTRACT

An embodiment stiffness reinforcement structure for a vehicle includes a support member including an upper end joined to a lateral end of a roof bow of a vehicle body and a lower end joined to a front frame disposed at a lower portion of the vehicle body to connect the roof bow and the front frame. The support member is disposed between a side pillar of the vehicle body and an interior of the vehicle body and is spaced apart from the side pillar at a lower region of the support member. The lower end of the support member is positioned further into the interior of the vehicle body than the upper end.

20 Claims, 10 Drawing Sheets

1

STIFFNESS REINFORCEMENT STRUCTURE FOR VEHICLE

CROSS-REFERENCE TO RELATED APPLICATIONS

This application claims the benefit of Korean Patent Application No. 10-2022-0171621, filed on Dec. 9, 2022, which application is hereby incorporated herein by reference.

TECHNICAL FIELD

The present disclosure relates to a stiffness reinforcement structure for a vehicle.

BACKGROUND

A battery is generally mounted on a roof of an electric bus.

Referring to a cross-section of an electric bus 100 illustrated in FIGS. 1 and 2, a roof bow 112 is provided to connect upper ends of side pillars 113. A roof panel or a carrier is installed on the roof bow 112, and a battery 131 is mounted on an upper portion of the roof panel or the carrier.

Because the battery is heavy in weight, a load is applied in a transverse direction while the bus travels, and the load adversely affects a structure of the bus 100.

In particular, in case that the bus 100 turns (see arrow A in FIG. 2), a transverse load is applied by the battery 131 in a direction (see arrow B in FIG. 2) opposite to a direction in which the bus 100 turns.

The load in the transverse direction is finely applied consistently not only when the bus 100 turns but also when the bus travels.

There is a problem in that when the transverse load is repeatedly applied, a portion where the side pillar 113 and the roof bow 112 are connected and a portion where the side pillar 113 and a front frame 115 are connected (portions indicated by C in FIG. 2) are fractured. Stress is concentrated on the portions by the repeatedly applied transverse load, which fractures the portions.

SUMMARY

The present disclosure relates to a stiffness reinforcement structure for a vehicle. Particular embodiments relate to a stiffness reinforcement structure for a vehicle that is capable of preventing damage to a vehicle body by supporting a load applied in a width direction of the vehicle when the vehicle travels in case that a heavyweight battery is mounted on an upper portion of the vehicle.

Accordingly, an embodiment of the present disclosure provides a stiffness reinforcement structure for a vehicle that is capable of maintaining a cross-sectional shape and preventing damage caused by concentration of stress even though a transverse load is repeatedly applied to a vehicle such as an electric bus.

As a preferred embodiment, a stiffness reinforcement structure for a vehicle includes a support member having an upper end joined to a lateral end of a roof bow of a vehicle and a lower end joined to a front frame disposed at a lower portion of the vehicle, the support member being configured to connect the roof bow and the front frame, in which the support member is spaced apart from a side pillar of the vehicle as it goes toward its lower end, so that the support member becomes directed toward an inside of the vehicle.

A distance between the support member and the side pillar may increase toward a lower side of the support member.

The lower end of the support member may be joined to the front frame inside the vehicle by a predetermined distance from a lateral end of the front frame.

A periphery of the lower end of the support member may be joined to the front frame by welding.

The stiffness reinforcement structure may further include a load transmission member configured to connect a middle portion of the support member and a middle portion of the side pillar of the vehicle.

The load transmission member may be provided in parallel with a width direction of the vehicle.

Peripheries of two opposite ends of the load transmission member may be joined to the support member and the side pillar by welding.

The stiffness reinforcement structure may further include a connection plate configured to connect the upper end of the support member to the lateral end of the roof bow.

An upper portion of the connection plate may be joined to the lateral end of the roof bow, and a lower portion of the connection plate may be joined to the upper end of the support member.

The connection plate may be joined to the roof bow and the support member by plug welding.

The connection plate may be disposed in a forward and rearward direction of the vehicle and provided at a portion where the support member and the roof bow are connected, and the connection plate may connect the support member and the roof bow.

The stiffness reinforcement structure may further include a reinforcement member installed on an upper portion of the support member and configured to overlap the support member, in which an assembly of the support member and the reinforcement member has a width equal to a width of the roof bow.

The reinforcement member may be disposed at the upper end of the support member and be configured to overlap the support member toward a rear side of the vehicle, the connection plate may be disposed at the upper end of the support member and be configured to connect the support member and the roof bow at a front side of the vehicle, and the connection plate may be disposed on the reinforcement member and be configured to connect the reinforcement member and the roof bow at the rear side of the vehicle.

The connection plate may be configured to connect the lateral end of the roof bow and an upper end of the side pillar of the vehicle and be supported on a cantrail disposed in a longitudinal direction of the vehicle.

The vehicle may be an electric bus having a battery mounted on a roof.

According to the stiffness reinforcement structure for a vehicle according to embodiments of the present disclosure configured as described above, the support member additionally can support the transverse load applied when the vehicle travels. Therefore, it is possible to prevent a vehicle body from being fractured by concentration of stress caused by the load repeatedly applied in the transverse direction of the vehicle.

DETAILED DESCRIPTION OF ILLUSTRATIVE EMBODIMENTS

Figure 1:
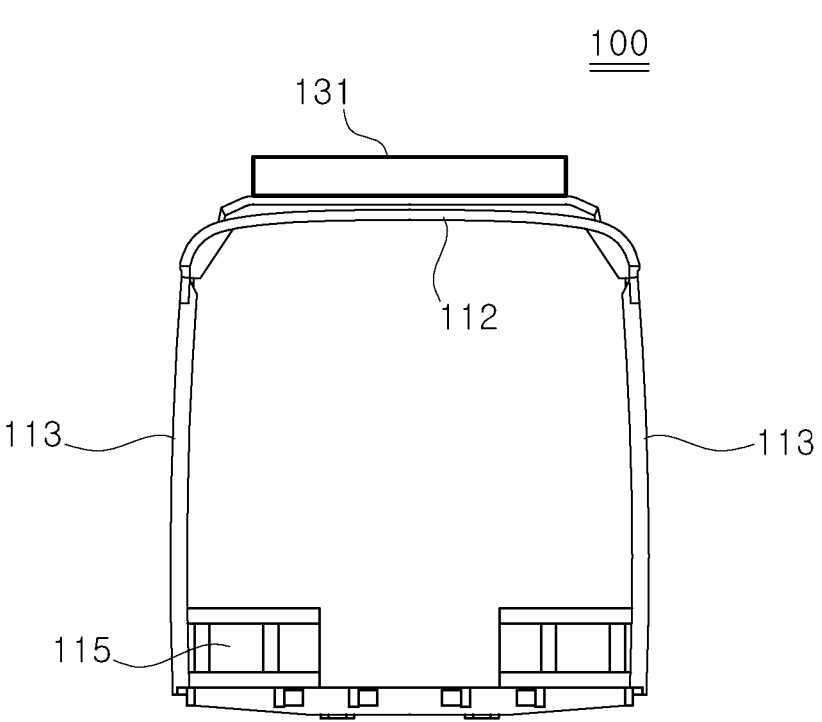
FIG. 1 is a cross-sectional view illustrating a structure of a vehicle in the related art.
Figure 2:
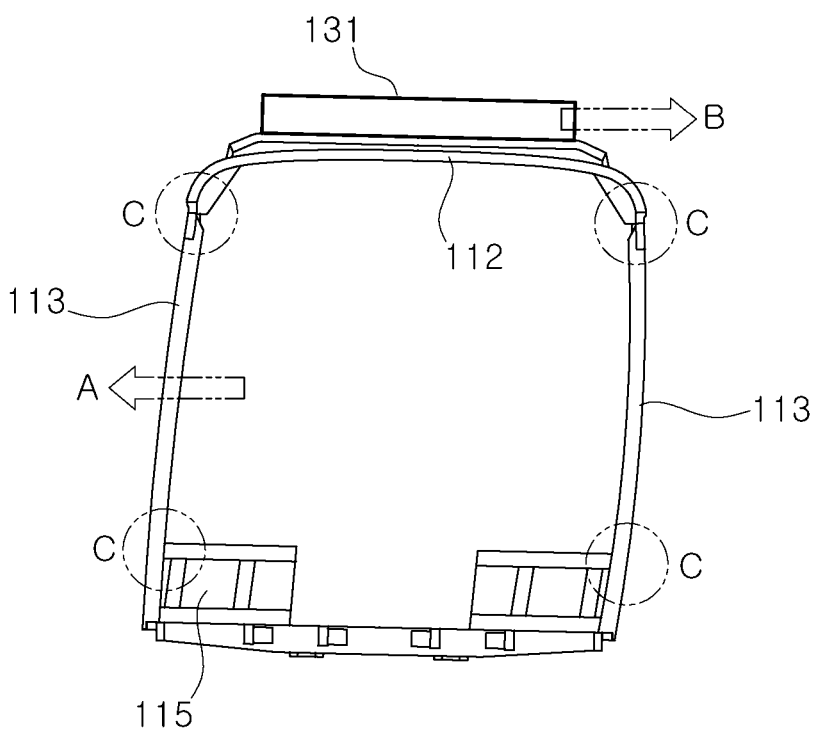
FIG. 2 is a cross-sectional view illustrating a state in which a vehicle body is deformed by a transverse load applied to the vehicle in the related art.
Figure 3:
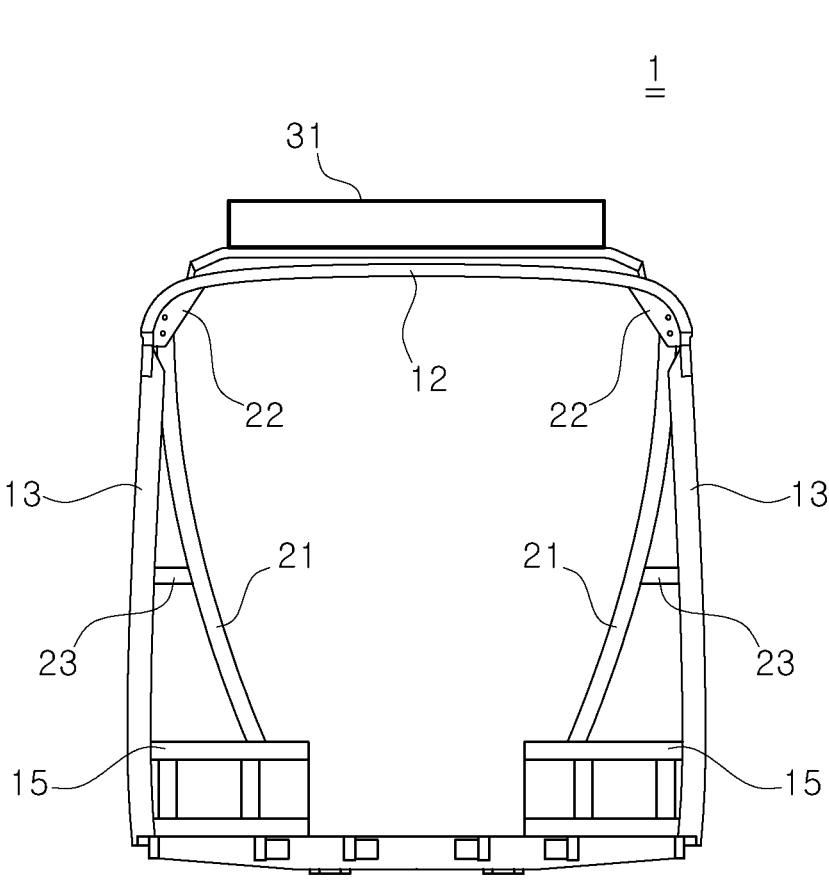
FIG. 3 is a cross-sectional view illustrating a vehicle body to which a stiffness reinforcement structure for a vehicle according to embodiments of the present disclosure is applied.
Figure 4:
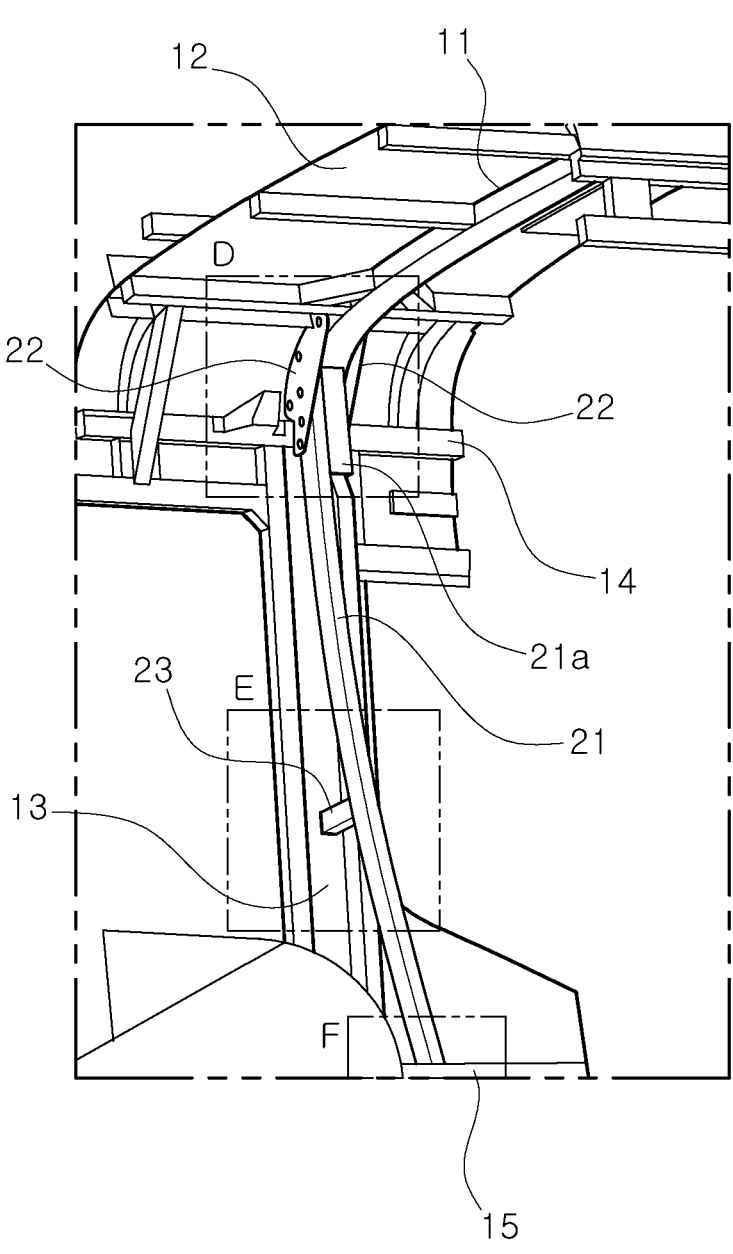
FIG. 4 is a perspective view illustrating an interior of the vehicle body to which the stiffness reinforcement structure for a vehicle according to embodiments of the present disclosure is applied.
Figure 5:
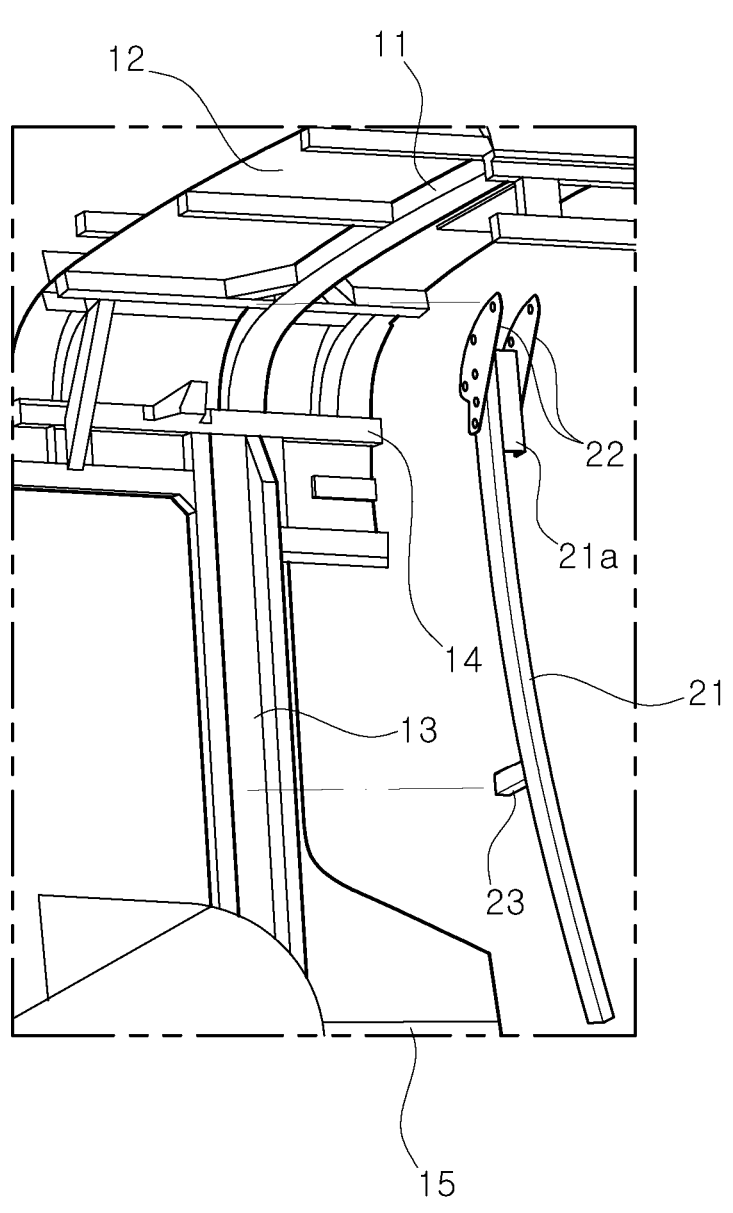
FIG. 5 is an exploded perspective view illustrating a state in which a support member is separated from the vehicle body to which the stiffness reinforcement structure for a vehicle according to embodiments of the present disclosure is applied.

Hereinafter, embodiments of the present disclosure will be described in detail with reference to the exemplary accompanying drawings, and since these embodiments, as examples, may be implemented in various different forms by those skilled in the art to which the present disclosure pertains, they are not limited to the embodiments described herein.

Hereinafter, a stiffness reinforcement structure for a vehicle according to embodiments of the present disclosure will be described in detail with reference to the accompanying drawings.

The stiffness reinforcement structure for a vehicle according to embodiments of the present disclosure includes support members 21 respectively having upper ends joined to lateral ends of a roof bow 12 of a vehicle 1 and lower ends joined to front frames 15 disposed at a lower portion of the vehicle 1, connection plates 22 configured to connect the upper ends of the support members 21 to the lateral ends of the roof bow 12, and load transmission members 23 configured to connect middle portions of the support members 21 and middle portions of side pillars 13 of the vehicle 1.

The roof bow 12 is provided on an upper portion of a vehicle body of the vehicle 1 and disposed in a width direction of the vehicle. A roof panel 11 is mounted on an upper surface of the roof bow 12 and configures a roof of the vehicle 1. In case that the vehicle 1 is an electric bus, a carrier is installed on an upper portion of the roof panel 11, and a battery 31 is mounted on the carrier.

The side pillars 13 are provided at two opposite ends of the roof bow 12 and disposed in a height direction of the vehicle 1. A cantrail 14 is provided between the roof bow 12 and the side pillar 13 and is disposed in a longitudinal direction of the vehicle 1.

The support member 21 is configured to connect upper and lower portions of the vehicle 1. The support member 21 may be provided in the form of a pipe, particularly a quadrangular pipe having a closed cross-section.

The upper end of the support member 21 is joined to the roof bow 12, and the lower end of the support member 21 is joined to the front frame 15 disposed at the lower portion of the vehicle 1, thereby making it possible to connect the roof bow 12 and the front frame 15.

Because the support member 21 is provided inside the side pillar 13 and additionally connects the roof bow 12 and the front frame 15, a load applied to the vehicle 1 in a transverse direction may be supported even though the battery 31 is mounted on the roof of the vehicle 1, which makes it possible to prevent deformation of and damage to a structure of the vehicle body. The support member 21 is provided inside the side pillar 13 and is disposed at a portion where the side pillar 13 is provided.

The support member 21 is spaced apart from the side pillar 13 as it goes toward its lower end, so that the support member 21 becomes directed toward the inside of the vehicle 1. That is, a distance between the support member 21 and the side pillar 13 increases toward the lower side of the support member 21. The lower end of the support member 21 is spaced apart from the side pillar 13, and a triangular structure is configured by the side pillar 13, the support member 21, and the front frame 15, such that stiffness of the vehicle body of the vehicle 1 is improved. In addition, because the support member 21 becomes spaced apart from the side pillar 13 toward the lower portion of the support member 21, a load of the roof is dispersed to the side pillar 13 and the support member 21 and transmitted to the lower portion of the vehicle 1.

In particular, the middle portion of the support member 21 may be positioned outside the vehicle from an imaginary line that connects the upper and lower ends of the support member 21. The support member 21 has a curved shape, such that a sufficient interior space may be ensured in comparison with a case in which the support member 21 has a straight shape. That is, the support member 21 and the side pillar 13 are close to each other at the upper portion of the support member 21, which is advantageous in ensuring the interior space.

A reinforcement member 21a is provided on the upper portion of the support member 21. The reinforcement member 21a having a predetermined length is provided at the upper end of the support member 21 and overlaps the support member 21. Because the reinforcement member 21a is additionally provided at the upper end of the support member 21, an assembly of the support member 21 and the reinforcement member 21a has a width equal to a width of the roof bow 12. At the time of connecting the support member 21 to the roof bow 12 by the connection plate 22, the support member 21 is connected to the roof bow 12 by the connection plate 22 in a forward and rearward direction of the vehicle 1 at the upper end of the support member 21.

The connection plate 22 connects the upper end of the support member 21 to the roof bow 12. The connection plate 22 has a predetermined area. The connection plate 22 is joined to the lateral end of the roof bow 12 and the upper end of the support member 21, such that the support member 21 and the roof bow 12 are connected. That is, an upper portion of the connection plate 22 is joined to the lateral end of the roof bow 12, and the lower portion of the connection plate 22 is joined to the upper end of the support member 21, such that the connection plate 22 may connect the support member 21 and the roof bow 12. The connection plate 22 is joined to the roof bow 12 and the support member 21 by plug welding W1, such that the connection plate 22 connects the support member 21 and the roof bow 12.

The connection plate 22 is disposed in the forward and rearward direction of the vehicle and provided at the portion where the support member 21 and the roof bow 12 are connected, thereby connecting the support member 21 and the roof bow 12.

Meanwhile, because the reinforcement member 21a is additionally provided on the upper portion of the support member 21, the connection plate 22 is disposed in the forward and rearward direction of the vehicle with respect to the assembly of the support member 21 and the reinforcement member 21a and connects the assembly of the support member 21 and the reinforcement member 21a to the roof bow 12. The reinforcement member 21a is provided at the upper end of the support member 21 and overlaps the support member 21 toward a rear side of the vehicle 1. The connection plate 22 is provided at the upper end of the support member 21 and connects the support member 21 and the roof bow 12 at a front side of the vehicle 1. The connection plate 22 is provided on the reinforcement member 21a and connects the reinforcement member 21a and the roof bow 12 at the rear side of the vehicle 1.

In this case, the connection plate 22 is supported on the cantrail 14. A portion of a periphery of the connection plate 22, which adjoins the cantrail 14, is provided to adjoin an outer surface of the cantrail 14. Thus, the connection plate 22 is placed on the cantrail 14, such that the connection plate 22 is supported by the cantrail 14.

The lower end of the support member 21 is joined to the front frame 15 inside the vehicle 1 by a predetermined distance from the lateral end of the front frame 15. That is, a periphery of a lower end of the front frame 15 is joined to the front frame 15 by welding W2.

The load transmission member 23 connects the middle portion of the support member 21 and the middle portion of the side pillar 13.

Figure 6:
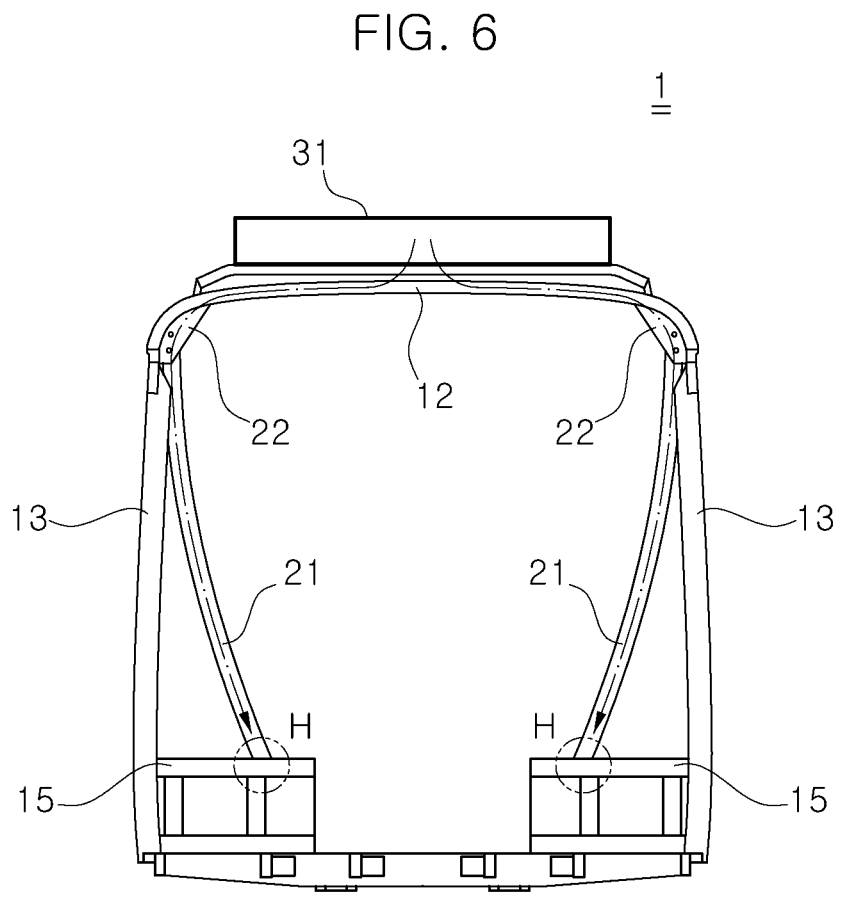
FIG. 6 is a cross-sectional view illustrating a load path made when a load transmission member is not applied to the stiffness reinforcement structure for a vehicle according to embodiments of the present disclosure.

The load transmission member 23 is provided in parallel with the width direction of the vehicle and disperses a load, which is transmitted to the lower portion of the vehicle 1, toward the side pillar 13 through the support member 21. If the load transmission member 23 is not applied, an overall load of the roof, which is transmitted through the support member 21, is transmitted to the lower end of the support member 21 (see FIG. 6). Therefore, a portion where the lower end of the support member 21 is connected to the front frame 15 (a portion indicated by H in FIG. 6) may be cracked.

Figure 7:
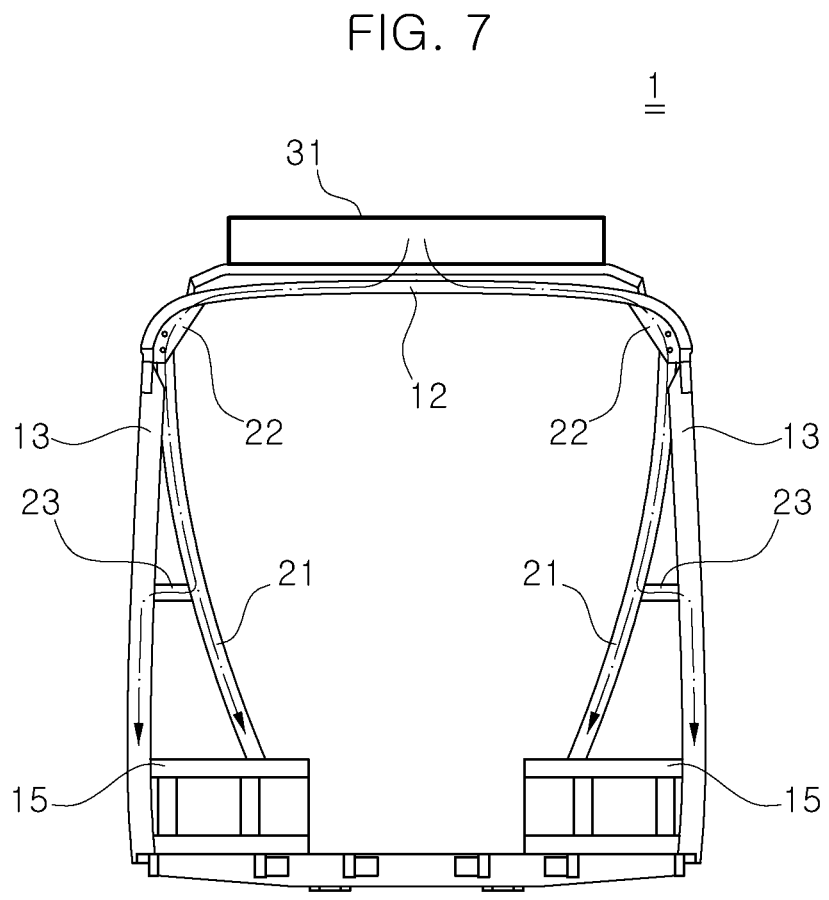
FIG. 7 is a cross-sectional view illustrating a load path made by the stiffness reinforcement structure for a vehicle according to embodiments of the present disclosure.
Figure 8:
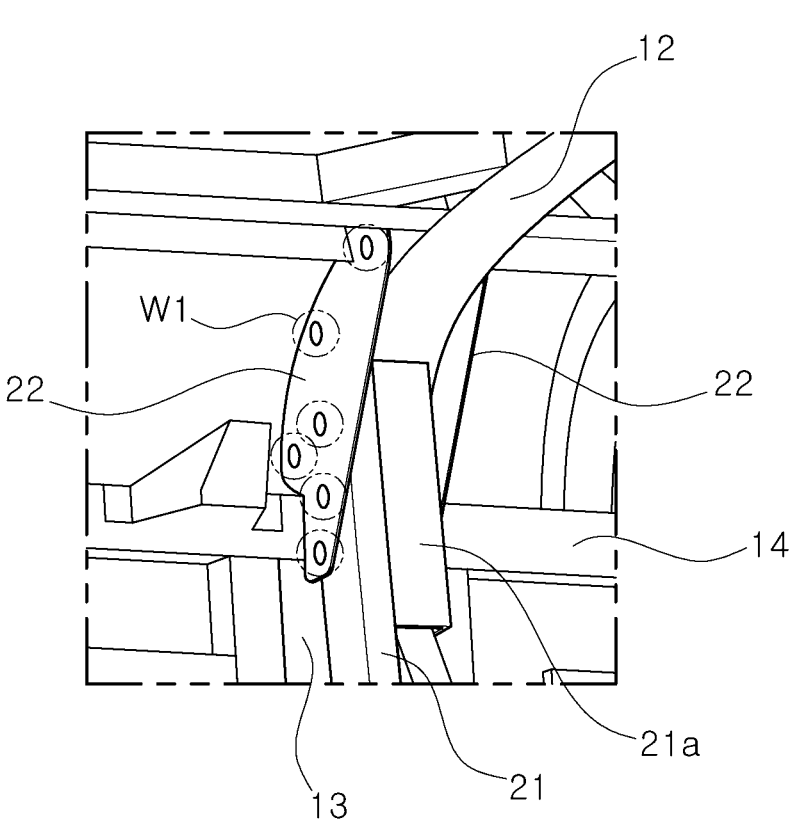
FIG. 8 is an enlarged perspective view of part D in FIG. 4.
Figure 9:
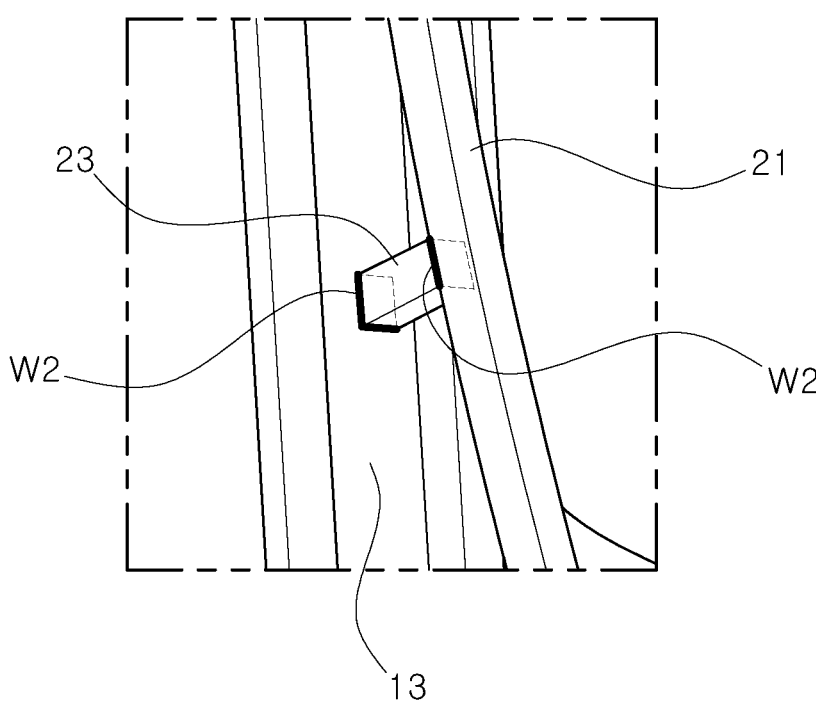
FIG. 9 is an enlarged perspective view of part E in FIG. 4.
Figure 10:
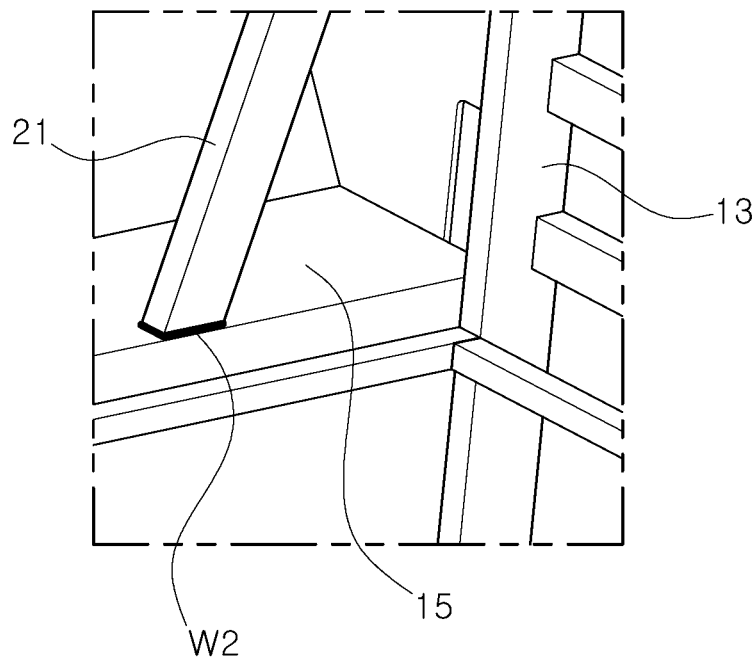
FIG. 10 is an enlarged perspective view of part F in FIG. 4.

Therefore, the load transmission member 23 is provided to disperse the load of the roof, which is transmitted to the support member 21, toward the side pillar 13 through the support member 21 (see FIG. 7), such that the occurrence of a crack between the lower end of the support member 21 and the front frame 15 is prevented.

Peripheries of two opposite ends of the load transmission member 23 are respectively joined to the side pillar 13 and the support member 21 by the welding W2.

What is claimed is:

1. A stiffness reinforcement structure for a vehicle, the structure comprising:
    a support member comprising:
        an upper end joined to a lateral end of a roof bow of a vehicle body; and
        a lower end joined to a front frame disposed at a lower portion of the vehicle body to connect the roof bow and the front frame,
    wherein the support member is disposed between a side pillar of the vehicle body and an interior of the vehicle body; and

a load transmission member connecting a middle portion of the support member and a middle portion of the side pillar,
    wherein the support member is spaced apart from the side pillar at a lower region of the support member, and
    wherein the lower end of the support member is positioned further into the interior of the vehicle body than the upper end.

2. The structure of claim 1, wherein a distance between the support member and the side pillar increases toward the lower region of the support member.

3. The structure of claim 1, wherein the lower end of the support member is joined to the front frame in the interior of the vehicle body at a predetermined distance from an exterior lateral end of the front frame.

4. The structure of claim 3, wherein a periphery of the lower end of the support member is weld-connected to the front frame.

5. The structure of claim 1, wherein the load transmission member is disposed parallel to a width direction of the vehicle.

6. The structure of claim 1, wherein peripheries of two opposite ends of the load transmission member are weld-connected to the support member and the side pillar.

7. A stiffness reinforcement structure for a vehicle, the structure comprising:
    a support member comprising:
        an upper end joined to a lateral end of a roof bow of a vehicle body; and
        a lower end joined to a front frame disposed at a lower portion of the vehicle body to connect the roof bow and the front frame;
    a connection plate connecting the upper end of the support member to the lateral end of the roof bow,
    wherein the support member is disposed between a side pillar of the vehicle body and an interior of the vehicle body; and
    a load transmission member connecting a middle portion of the support member and a middle portion of the side pillar,
    wherein the support member is spaced apart from the side pillar at a lower region of the support member, and
    wherein the lower end of the support member is positioned further into the interior of the vehicle body than the upper end.

8. The structure of claim 7, wherein:
    an upper portion of the connection plate is joined to the lateral end of the roof bow; and
    a lower portion of the connection plate is joined to the upper end of the support member.

9. The structure of claim 7, wherein the connection plate is plug weld-connected to the roof bow and the support member.

10. The structure of claim 7, further comprising a reinforcement member on an upper portion of the support member, and overlapping the support member, wherein an assembly of the support member and the reinforcement member has a width equal to a width of the roof bow.

11. The structure of claim 10, wherein:
    the reinforcement member is disposed at the upper end of the support member and overlaps the support member toward a rear side of the vehicle;
    the connection plate is disposed at the upper end of the support member and connects the support member and the roof bow at a front side of the vehicle; and the connection plate is disposed on the reinforcement member and connects the reinforcement member and the roof bow at the rear side of the vehicle.

12. The structure of claim 7, wherein the connection plate connects the lateral end of the roof bow and an upper end of the side pillar of the vehicle and is supported on a cantrail disposed in a longitudinal direction of the vehicle.

13. The structure of claim 7, wherein the load transmission member is disposed parallel to a width direction of the vehicle.

14. The structure of claim 7, wherein peripheries of two opposite ends of the load transmission member are weld-connected to the support member and the side pillar.

15. A vehicle comprising:
   a vehicle body;
   a roof bow extending in a width direction of the vehicle body;
   a pair of front frames disposed at a lower portion of the vehicle body on opposite sides of the vehicle body in the width direction;
   a pair of side pillars disposed on the opposite sides of the vehicle body and extending in a height direction of the vehicle body; and
   a pair of support members disposed on the opposite sides of the vehicle body, each of the support members comprising:
      an upper end joined to a lateral end of the roof bow, respectively; and
      a lower end joined to the front frames, respectively, to connect the roof bow and the front frames, wherein the support members are disposed between the side pillars and an interior of the vehicle body,
   wherein the support members are spaced apart from the side pillars at lower regions of the support members, and
   wherein the lower ends of the support members are positioned further into the interior of the vehicle body than the upper ends.

16. The vehicle of claim 15, wherein a distance between the support members and the side pillars increases toward the lower regions of the support members.

17. The vehicle of claim 15, wherein the lower ends of the support members are joined to the front frames in the interior of the vehicle body at a predetermined distance from exterior lateral ends of the front frames, respectively.

18. The vehicle of claim 15, further comprising a pair of load transmission members disposed on the opposite sides of the vehicle body and respectively connecting middle portions of the support members and middle portions of the side pillars.

19. The vehicle of claim 15, further comprising a pair of connection plates disposed on the opposite sides of the vehicle body and respectively connecting the upper ends of the support members to the lateral ends of the roof bow.

20. The vehicle of claim 15, wherein:
   the vehicle is an electric bus; and
   a battery is mounted on a roof of the electric bus.

* * * * *